US010409994B1

(12) United States Patent
Kammler et al.

(10) Patent No.: US 10,409,994 B1
(45) Date of Patent: Sep. 10, 2019

(54) FPGA/ASIC FRAMEWORK AND METHOD FOR REQUIREMENTS-BASED TRUST ASSESSMENT

(71) Applicant: National Technology & Engineering Solutions of Sandia, LLC, Albuquerque, NM (US)

(72) Inventors: Vivian G. Kammler, Albuquerque, NM (US); Robert C. Armstrong, Dublin, CA (US); Andrew Michael Smith, Davis, CA (US); Jackson R. Mayo, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 198 days.

(21) Appl. No.: 15/446,787

(22) Filed: Mar. 1, 2017

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *G06F 21/57* | (2013.01) |
| *G06F 17/50* | (2006.01) |
| *G06F 21/76* | (2013.01) |

(52) U.S. Cl.
CPC ........ *G06F 21/577* (2013.01); *G06F 17/5081* (2013.01); *G06F 21/76* (2013.01); *G06F 2221/034* (2013.01)

(58) Field of Classification Search
CPC ............... G06F 21/577; G06F 17/5081; G06F 2221/034; G06F 17/5045; G06F 17/5054; G06F 21/76
See application file for complete search history.

(56) References Cited

U.S. PATENT DOCUMENTS

| | | | |
|---|---|---|---|
| 5,249,133 A | 9/1993 | Batra | |
| 6,560,571 B1 * | 5/2003 | McBride | G06F 17/5022 703/14 |
| 6,789,237 B1 * | 9/2004 | Ismail | G06F 17/504 703/13 |
| 6,904,576 B2 | 6/2005 | Ng et al. | |

(Continued)

OTHER PUBLICATIONS

Malik et al., Hardware Trojan Detection for Gate-level ICs Using Signal Correlation Based Clustering, 2015 (Year: 2015).*

(Continued)

*Primary Examiner* — Trong H Nguyen
(74) *Attorney, Agent, or Firm* — Medley, Behrens & Lewis, LLC (57) ABSTRACT

Described herein are various technologies for metrics-based assessment and trust verification of netlists for hardware logic devices (e.g., ASICs, FPGAs, etc.). A computing system translates a netlist of a hardware logic device into a Boolean network. The computing system generates and assigns metrics to edges of the Boolean network. The metrics comprise a coverage metric, a rare trigger metric, and an influence metric. Based upon the metrics, the computing system assigns the nodes in the Boolean network criticality values. The computing system determines a likelihood of a vulnerability in the netlist based upon the criticality values. The computing can output an indication as to whether the netlist is trusted based upon the determined likelihood of a vulnerability in the netlist.

18 Claims, 6 Drawing Sheets

(56) References Cited

U.S. PATENT DOCUMENTS

| | | |
|---|---|---|
| 7,240,316 B2 | 7/2007 | Regnier |
| 7,441,215 B1 | 10/2008 | Sahrling |
| 7,657,851 B2 | 2/2010 | Granovsky et al. |
| 7,681,160 B1 * | 3/2010 | Bosco ................. G06F 17/5031 |
| | | 716/113 |
| 2004/0030999 A1 | 2/2004 | Ng et al. |
| 2007/0226572 A1 * | 9/2007 | Zhang ................... G06F 11/261 |
| | | 714/742 |
| 2009/0007034 A1 | 1/2009 | Granovsky et al. |

OTHER PUBLICATIONS

Beaumont et al., Hardware Trojans—Prevention, Detection, Countermeasures, 2011. (Year: 2011).*
Sullivan et al., FIGHT-Metric: Functional Identification of Gate-Level Hardware Trustworthiness, 2014 (Year: 2014).*
Chakraborty et al., MERO: A Statistical Approach for Hardware Trojan Detection, 2009 (Year: 2009).*
Waksman et al., FANCI: Identification of Stealthy Malicious Logic Using Boolean Functional Analysis. (Year: 2013).*
Muehlberghuber et al., Red Team vs. Blue Team Hardware Trojan Analysis. (Year: 2013).*

* cited by examiner

FPGA/ASIC FRAMEWORK AND METHOD FOR REQUIREMENTS-BASED TRUST ASSESSMENT

STATEMENT OF GOVERNMENTAL INTEREST

This invention was developed under Contract DE-AC04-94AL85000 between Sandia Corporation and the U.S. Department of Energy. The U.S. Government has certain rights in this invention.

BACKGROUND

Tamper targets are regions of software used to configure hardware logic devices (e.g., Field-programmable Gate Arrays (FPGAs), Application-Specific Integrated Circuits (ASICs), etc.) that are susceptible to vulnerabilities. A vulnerability can comprise instructions that lead to the hardware logic devices operating in an undesired manner (or failure of the hardware logic devices). Additionally, a vulnerability can comprise instructions that result in a trojan being inserted into hardware (referred to as a trojan insertion). The vulnerabilities are often detected only after the hardware logic devices have been field-operated. Further, detecting vulnerabilities is difficult because conventional hardware logic devices comprise inordinately large numbers of possible activation mechanisms for the vulnerabilities.

Untrusted design tools can place a trojan insertion in the software during the design of a hardware logic device. A trojan insertion can act as a "spy" for actors responsible for the trojan insertion or lead to failure of a hardware logic device that has been subject to the trojan insertion. Further, a trojan insertion can be designed such that the resultant trojan remains hidden for normal operation and conventional testing of the hardware logic device.

At hardware logic device design and verification stages, hardware logic device software can be considered trusted due to being managed by trusted operators. Trust via chain-of-custody, however, breaks down because the untrusted design tools can insert trojans into the hardware logic device software (e.g., netlists) at stages of the hardware logic device design that are not verified at verification stages. There are currently no scalable or diverse means of ensuring that hardware logic devices are trustworthy based upon the trusted stages of hardware logic design and verification.

SUMMARY

The following is a brief summary of subject matter that is described in greater detail herein. This summary is not intended to be limiting as to the scope of the claims.

Described herein are technologies pertaining to trust verification of netlists of hardware logic devices (e.g., FPGAs, ASICs, etc.). A computing system is configured to receive a netlist that can be employed to configure a hardware logic device, wherein an untrusted design tool synthesizes hardware description language (HDL) source code into the netlist. The netlist can be mapped onto the internal structure of the hardware logic device (e.g., via a bitstream generator), thereby enabling the hardware logic device to operate according to the netlist.

The computing system translates the netlist into a Boolean network, where the Boolean network comprises nodes and edges, wherein an edge connects two nodes in the Boolean network. The nodes in the Boolean network represent Boolean transfer functions. The Boolean transfer functions represent combinational and sequential logic of the netlist. The computing system generates metrics and assigns the metrics to edges of the Boolean network. Based upon the metrics, the computing system assigns the nodes in the Boolean network a criticality value. The criticality value assigned to a node in the Boolean network is indicative of a probability that a transfer function represented by the node comprises a tamper target (relative to probabilities of other transfer functions represented by other nodes in the Boolean network comprising a tamper target). The tamper target is susceptible to a vulnerability (e.g., unintended logic, a trojan insertion, etc.).

Further, the computing system is configured to rank the nodes in the Boolean network based upon the criticality values assigned thereto. Based upon the ranking of the nodes, the computing system can identify one or more nodes as being highly critical. Additionally, the computing system can stack (e.g., group) the identified nodes to identify regions of concern, where the regions of concern are regions in the Boolean network that are tamper targets and, thus, susceptible to vulnerabilities (e.g., unintended logic, trojan insertions, etc.). The computing system determines a likelihood of a vulnerability in the netlist based upon features of the regions of concern (e.g., a minimum or maximum number of nodes in the regions of concern).

The computing system can output an indication as to which regions of the Boolean network are highly critical (vulnerability is most costly) or comprise regions of concern. Further, the computing system can output an indication as to whether the netlist is trusted based upon the determined likelihood that vulnerability in the netlist has been detected.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to metrics-based assessment of synthesized netlists for ASICs and FPGAs are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
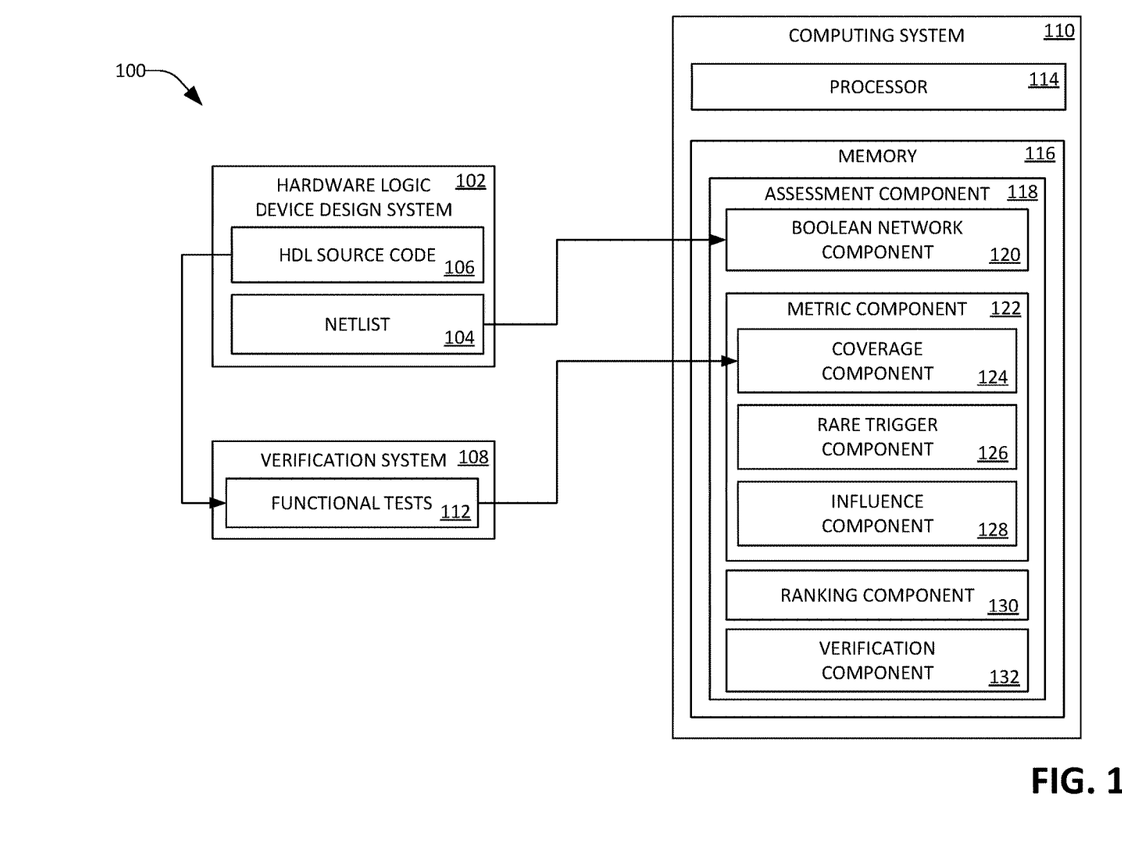
FIG. 1 is a functional block diagram of an exemplary system that facilitates trust verification of netlists of hardware logic devices.

With reference to FIG. 1, an exemplary system 100 that facilitates trust verification of netlists that are employed to configure hardware logic devices (e.g., FPGAs, ASICs, etc.) is illustrated. The exemplary system 100 comprises a hardware logic device design system 102 that is configured to output a netlist 104, wherein the netlist is employable to configure hardware of a hardware logic device. More specifically, the hardware logic device design system 102 can receive a requirements definition (e.g., from a programmer for the hardware logic device), and can output the netlist 104 based upon the requirements definition. For example, the hardware logic device can be an FPGA, and the requirements definition can require that the FPGA generate a range of outputs based upon a specified set of input values. The hardware logic device design system 102, based upon the requirements definition, can generate HDL source code 106 (e.g., Verilog, VHDL, etc.) that satisfies the requirements definition (e.g., with respect to a high-level representation of the hardware logic device). The hardware logic device design system 102 can derive lower-level representations and wiring for the hardware logic device based upon the HDL source code 106 and known attributes of the hardware logic device. Due to defects or errors of the hardware logic device design system 102, the HDL source code 106 can comprise a vulnerability (e.g., instructions that lead to unintended behavior of the hardware logic device).

Subsequent to generating the HDL source code 106, design tools (e.g., hard logic device-specific electronic design automation software) synthesize the HDL source code 106 into the netlist 104. The netlist 104 can be mapped onto the hardware logic device's internal structure (e.g., via a bitstream generator), thereby enabling the hardware logic device to operate according to the requirements definition. The design tools comprise proprietary third-party software that is unverified by the hardware logic device design system 102. External and prior to the hardware logic device design system 102 employing the design tools to synthesize the netlist 104, malicious actors can configure the design tools to inserts trojans (e.g., logic not represented in the HDL source code 106), a vulnerability, during the synthesis of the netlist 104. Therefore, the design tools are untrusted. Conventionally, there are no suitable tools to detect the possibility of trojans in the netlist 104 that is synthesized by design tools.

In the exemplary system 100, the hardware logic device system 102 is configured to send the HDL source code 106 to a verification system 108. Further, as will be discussed in greater detail below, the hardware logic device system 102 is configured to send the netlist 104 to a computing system 110.

Based upon the HDL source code 106, at the verification system 108, functional tests 112 can be generated (e.g., by a design verification engineer who operates the verification system 108, by automated testing suites of the verification system 108, etc.). The functional tests 112 for the HDL source code 106 comprise at least one test that determines whether a part of the HDL source code 106 nominally operates according to the requirements definition. A test from the functional tests 112, for example, can comprise determining whether the HDL source code 106 generates an expected output upon receipt of an input. The functional tests 112 can further comprise determining whether branches of the HDL source code 106 operate according to the requirements definition. Additionally, the functional tests 112 can comprise tests that are received from a database (e.g., a Unified Coverage Database).

The exemplary system 100 further comprises a computing system 110 that is generally configured to determine a likelihood of a vulnerability (e.g., unintended logic, trojan insertion by untrusted design tools in a synthesized netlist of a hardware logic device, etc.), prior to the hardware logic device being configured based upon the netlist. The computing system 110 is further configured to output an indication as to whether the synthesized netlist 104 is to be labeled as trusted based upon the determination of the likelihood of the vulnerability.

The computing system 110 comprises at least one processor 114 and memory 116. The memory 116 comprises an assessment component 118 that, when executed by the at least one processor 114, determines a likelihood of the synthesized netlist 104 including a vulnerability (e.g., a trojan insertion, unintended logic, etc.) based upon a ranking of nodes in a Boolean network (translated from the synthesized netlist 104) in order of criticality. The criticality of a node in the Boolean network is indicative of the possibility of whether the node, relative to other nodes in the Boolean network, comprises a tamper target. The tamper target can comprise a vulnerability (e.g., a trojan insertion, unintended logic, etc.). The assessment component 118 determines the criticality of the nodes based upon assessment metrics. The assessment component 118 generates the assessment metrics based upon 1) coverage generated from functional testing; 2) identified rare triggers in the synthesized netlist; or 3) stability of a Boolean network generated based upon the synthesized netlist.

Figure 2:
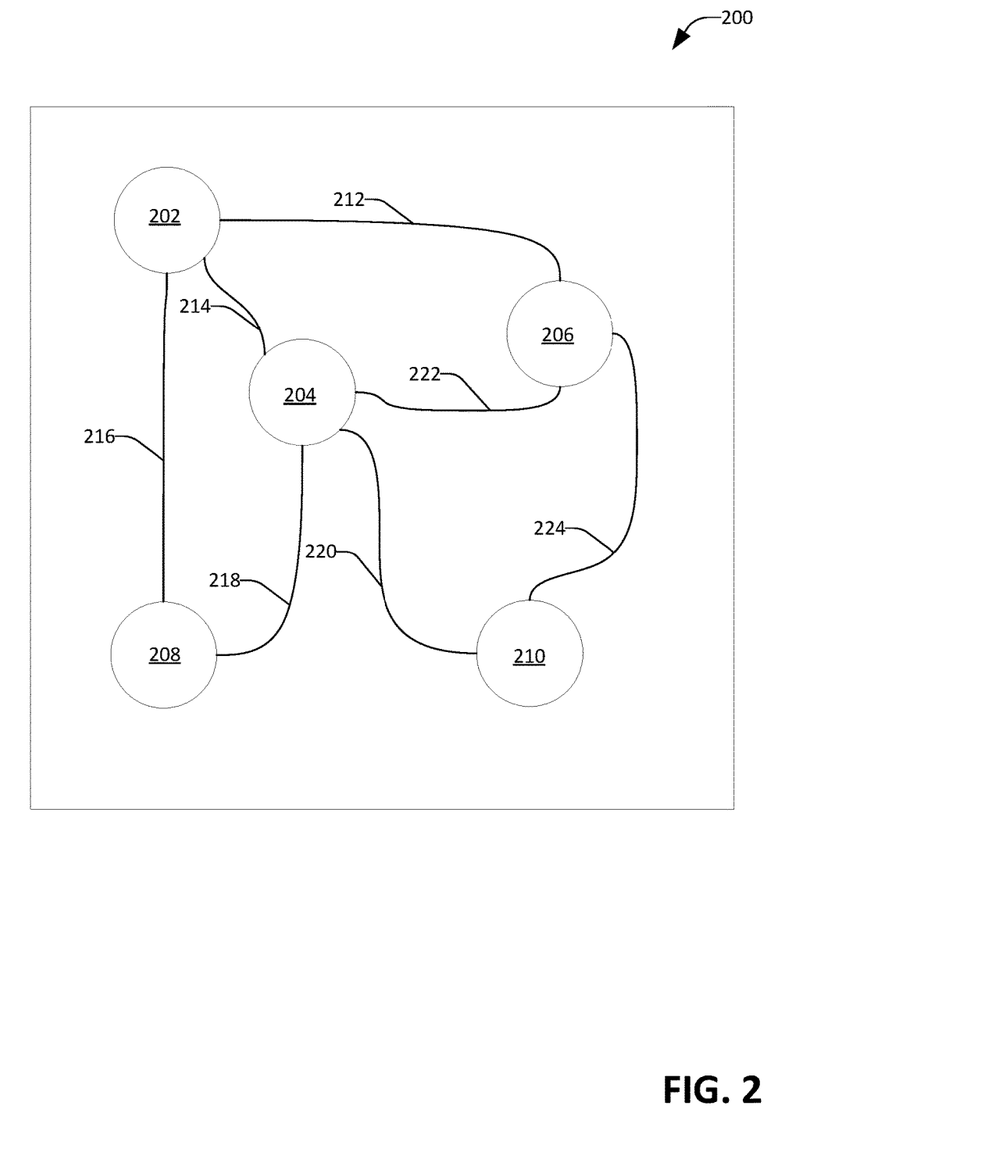
FIG. 2 is an illustration of a Boolean network representation of a netlist.

The assessment component 118 includes a Boolean network component 120, wherein the Boolean network component 120 is configured to receive the netlist 104 generated by the hardware logic device design system, and is further configured to translate the netlist 104 into a Boolean network. Turning now to FIG. 2, an exemplary Boolean network 200, wherein the Boolean network 200 represents the netlist 104 is illustrated. The Boolean network 200 comprises sequential nodes 202-210, wherein the sequential nodes 202-210 represent Boolean transfer functions. The Boolean network 200 further comprises edges 212-224, wherein an edge from edges 212-224 connects two nodes from the sequential nodes 202-210. More particularly, the Boolean network 200 has a set of n nodes linked to each other by edges in a directed graph G. Each node i has a Boolean state in $\{-1, +1\}$, an in-degree K, and an associated Boolean function $f_i: \{-1, +1\}^K \rightarrow \{-1, +1\}$, termed a Boolean transfer function. If the state of node i at time t is $x_i(t)$, its state at time t+1 is described by $x_i(t+1) = f_i(x_{i_1}(t), \ldots, x_{i_K}(t))$.

The Boolean network component 120 can translate the netlist 104 into the Boolean network 200 by, for example, executing a mapping algorithm that maps logical cells of the netlist 104 to logic functions (e.g., AND, OR, XOR, etc.). Further, executing the mapping algorithm can comprise generating the Boolean transfer functions based upon determining that parts of the netlist 104 are combinational or sequential logic. The resulting Boolean network 200 is a representation of the netlist 104, wherein the computing system 110 can assign metrics to the nodes 202-210 or the edges 212-224 of the Boolean network 200 and execute functions (e.g., metric assignment, search, etc.) over the Boolean network 200.

Returning to FIG. 1, the assessment component 118 further comprises a metric component 122 that is configured to generate metrics that can be assigned to edges of the Boolean network 200. The metrics can be based upon: 1) coverage generated from functional testing; 2) identified rare triggers in the synthesized netlist; and/or 3) stability of the Boolean network. The computing system 110 can rank the nodes of the Boolean network in order of criticality based upon the metrics. The computing system 110, as will be discussed in greater detail below, can further identify nodes as highly critical (based upon the ranking).

In the exemplary system 100, the metric component 122 comprises a coverage component 124 that is configured to generate coverage metrics for the edges of the Boolean network 200 based upon functional tests and to assign the coverage metrics to the edges of the Boolean network 200. The coverage component 124 can receive functional tests 112 from the verification system 108.

Actions of the coverage component 124 when assigning coverage metrics to edges of the Boolean network 200 are now set forth in greater detail. The coverage component 124 remaps the functional tests 112 to the netlist 104. Remapping the functional tests 112 to the netlist 104 allows the coverage component 124 to identify states of the netlist 104 that are covered by functional tests 112. For example, when a functional test determines that an input into the HDL source code 106 generates output according to a requirements definition, the coverage component 124 can remap the functional test to the netlist 104 by identifying states of the netlist 104 that correspond to the conditional test. Responsive to identifying states of the netlist 104 that have been tested by the functional tests 112, the coverage component 124 is further configured to assign a coverage metric to corresponding edge(s) of the Boolean network 200. For example, when the coverage component 124 remaps the functional tests 112 to states of the netlist 104, corresponding edges of the Boolean network (that are translated based upon the remapped states of the netlist) can be assigned coverage metrics that indicate that the edges have been covered by the functional tests 112. Additionally, when the functional tests 112 do not remap to states of the netlist 104, the coverage component 124 can assign coverage metrics that indicate that corresponding edges have not been covered by the functional tests 112.

The metric component 122 further comprises a rare trigger component 126 that generates and assigns rare trigger metrics to edges of the Boolean network 200 that indicate whether regions of the Boolean network 200 are rare triggers. The rare triggers comprise regions of the Boolean network 200 that correspond to logic in the netlist 104 that is rarely triggered (e.g., logic that is not activating during most of the field-operation of a hardware logic device that is configured in accordance with the netlist 104). More specifically, logic in the netlist 104 that is rarely triggered comprises input wires of a hardware logic device (that is to be configured according to the netlist 104) that have capability to serve as tamper targets because they almost never determine values of output wires of the hardware logic device. The rare trigger component 126 generates the rare trigger metrics based upon an analysis of generated control value vectors of output wires in the netlist 104.

The control value vectors comprise control values for dependencies of the output wires. The control values quantify how weak or strong the dependencies are. For example, an output wire $w_1$ can have n dependencies. The rare trigger component 126 generates control values for each of the n dependencies and generates a control value vector for the output wire $w_1$. The control value of an input wire $w_2$ (from the n dependencies) on the output wire $w_1$ quantifies how much a truth table representing the computation of $w_1$ is influenced by the column corresponding to the input wire $w_2$. The control values range in value from zero to one. When a control value is close to zero (but not zero), the control value generally indicates that the input wire $w_2$ is nearly unused when the hardware logic device is configured with the netlist 104. When the control value is close to one, the control value generally indicates that the input wire $w_2$ is frequently used when the hardware logic device is configured with the netlist 104. In an example, the rare trigger component 126 generates control values for each dependency of the output wires. In another example, the rare trigger component 126, generates control values control values for a randomly selected and predetermined number (e.g., 50) of dependencies of the output wires.

Subsequent to assigning the control value vectors to the output wires of the netlist 104, the rare trigger component 126 determines whether the control value vectors satisfy heuristics to determine whether or not an output wire is suspicious enough to be flagged as a rare trigger. The heuristics, for example, can comprise: 1) a median of the control values of the control value vectors is close to zero; 2) a mean of the control values of the control value vectors is close to zero; and/or 3) the median and the mean of the control values of the control value vectors are close to zero. Responsive to determining that a control value vector satisfies a selected heuristic, the rare trigger component 126 can flag an output wire (corresponding to the control value vector) as a rare trigger.

In addition to flagging an output wire as a rare trigger based upon the control value vectors and the heuristics, the rare trigger component 126 is configured to assign rare trigger metrics to edge(s) of the Boolean network 200. For example, when the rare trigger component 126 flags an output wire as a rare trigger in the netlist 104, corresponding edges of the Boolean network 200 can be assigned rare trigger metrics that indicate that the edges do not correspond to rare triggers. Additionally, when the rare trigger component 126 does not flag an output wire as a rare trigger in the netlist 104, corresponding edges of the Boolean network can be assigned rare trigger metrics that indicate that the edges do not correspond to rare triggers.

The metric component 122 further comprises an influence component 128 that is configured to generate and assign influence metrics to edges of the Boolean network 200. The influence metrics are indicative of a probability of whether flipping a state of a node in the Boolean network 200 changes the state of its neighbors. More specifically, the influence metrics indicate whether the flipping of a state of a node would cascade over time (e.g., cause chaos) in the Boolean network 200. The influence component 128 derives the influence metrics based upon Fourier coefficients (using Walsh-Hadamard transforms of truth tables) of the Boolean transfer functions in the Boolean network 200. More particularly, the influence component 128 executes a Fourier decomposition of the Boolean transfer functions (represented in the Boolean network 200) to generate a formula for predicting short-term dynamics of the Boolean network 200, for any fixed distribution of the Boolean transfer functions. The Fourier decomposition represents a Boolean function (which is a discrete object) as a multilinear polynomial over its inputs.

The influence component 128 is further configured to assign the influence metrics to edge(s) of the Boolean network 200. For example, when the influence component 128 determines that flipping a state of a node in the Boolean network is likely to cascade over time in the Boolean network 200, downstream edges of the node in the Boolean network 200 can be assigned influence metrics that indicate that the edges are connected to the node. Additionally, when the influence component 128 determines that flipping a state of node in the Boolean network 200 is unlikely to cascade over time in the Boolean network 200, downstream edges of the node can be assigned influence metrics that indicate that the edges are not connected to a node.

The assessment component 118 further comprises a ranking component 130. The ranking component 130 is configured to assign nodes criticality values and to rank the nodes of the Boolean network 200 in order of the criticality values. The criticality value of a node in the Boolean network 200 is indicative of the possibility of the node, relative to other nodes in the Boolean network 200, representing a tamper target in the netlist 104. The ranking component 130 generates and assigns the criticality values to nodes based upon the metrics generated by the metric component 122. Responsive to the metric component 122 generating metrics for the edges of the Boolean network 200, the ranking component 130 generates a criticality value for a node based upon whether or not edges connected to the node satisfy a set of rules. The rules can define that nodes are to be assigned high criticality values, relative to other nodes, when the edges (connected to the nodes) comprise: 1) coverage metrics that indicate that the edges have not been covered by the functional tests 112; 2) rare trigger metrics that indicate that the edges are rare triggers; or 3) influence metrics that indicate that the edges are connected to influential nodes. For example, the ranking component 130 can generate and assign a node in the Boolean network 200 a high criticality value (relative to other nodes) when coverage metrics for edges connected to the node are less than combined rare trigger metrics and influence metrics for the edges.

As indicated previously, the ranking component 130 is configured to rank the nodes in order of the criticality values assigned thereto. Further, the ranking component 130 can be configured to identify certain ranked nodes as highly critical when the nodes satisfy a selection criteria (e.g., a predetermined number of the nodes with highest criticality values, a select percentage of nodes with the highest criticality values, etc.). The highly critical nodes correspond to logic in the netlist 104 that is more likely to contain a tamper target relative to other logic in the netlist 104. Generally, nodes with the highest criticality values are likely to indicate a vulnerability and, thus, considered most costly.

Further, the ranking component 130 can stack the nodes to identify regions of concern. The regions of concern in the Boolean network 200 are regions in the Boolean network 200 that are likely susceptible to vulnerabilities. For example, the ranking component 130 can be configured to stack (e.g., group) nodes in the Boolean network 200 that are connected to edges comprising coverage metrics that indicate the edges have not been covered by the functional tests and rare trigger metrics that indicate that the edges are rare triggers. In another example, the ranking component 130 can be configured to stack nodes in the Boolean network 200 that are connected to edges comprising coverage metrics that indicate that the edges have not been covered by the functional tests and influence metrics that indicate that the edges are connected to influential nodes. The ranking component 130 identifies the stacked nodes as the regions of concern.

Figure 3:
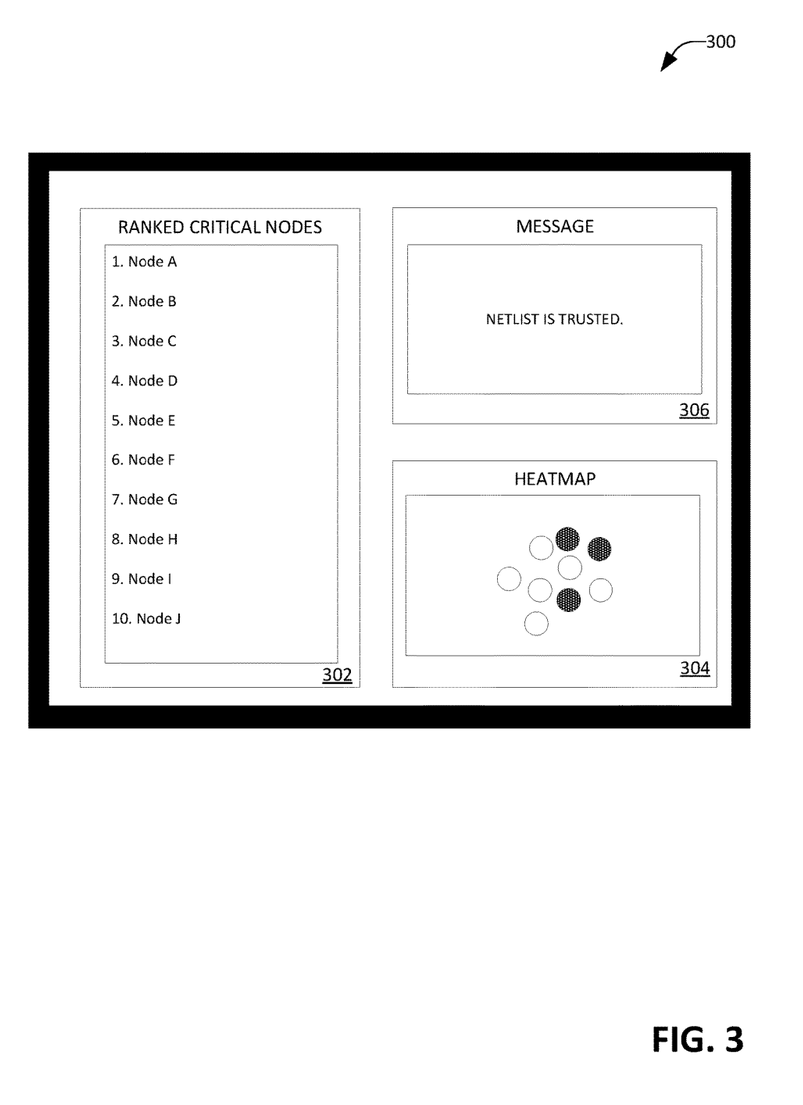
FIG. 3 is an exemplary display comprising indications generated by an exemplary system that facilitates verification of netlists of hardware logic devices.

The ranking component 130 is further configured to output an indication as to which nodes of the Boolean network 200 have been identified as highly critical or as to which nodes in the Boolean network 200 represent regions in the netlist 104 that are regions of concern. With reference to FIG. 3, an exemplary graphical user interface (GUI) 300 comprising indications that the ranking component 130 (of the computing system 110) outputs is illustrated. In the GUI 300, a list of ten nodes 302 in the Boolean network 200 that the computing system 110 identifies as being highly critical can be presented. Further, the GUI can include a heatmap representation 304 of the Boolean network 200 that highlights the regions of concern in the Boolean network 200.

Returning to FIG. 1, the assessment component 118 further comprises a verification component 132 that determines the likelihood of a vulnerability (e.g., trojan insertion, unintended logic, etc.) in the netlist 104 based upon features of the regions of concern in the Boolean network 200 that have been identified by the ranking component 130. The verification component 132, further, outputs an indication as whether the netlist 104 is trusted based upon the determined likelihood. The features of identified regions of concern can comprise: a minimum or maximum number of identified regions, a minimum or maximum number of nodes in the identified regions, the identified regions having a minimum or maximum metric score (e.g., individual rare trigger metric, combined metrics, etc.), etc. In an example, the verification component 132 determines that the netlist 104 is unlikely to comprise a vulnerability when the ranking component 130 identifies fewer than five regions of concern in the Boolean network 200. In the example, the verification component 132 outputs an indication that the netlist 104 is trusted based on the determination. With reference to FIG. 3, the indication can comprise a message 306 on the display 300 that the netlist 104 is trusted.

Figure 4:
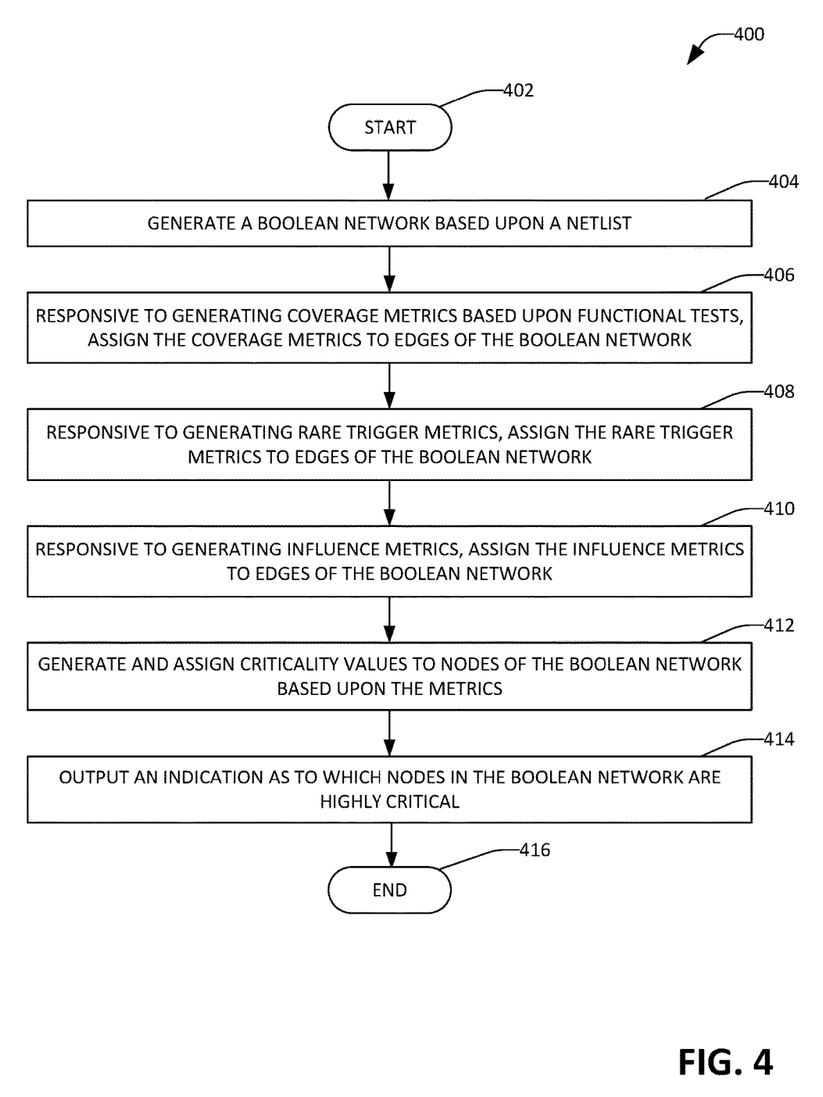
FIG. 4 is flow diagram that illustrates an exemplary methodology for outputting an indication as to which nodes in a Boolean network representation of a netlist are highly critical.
Figure 5:
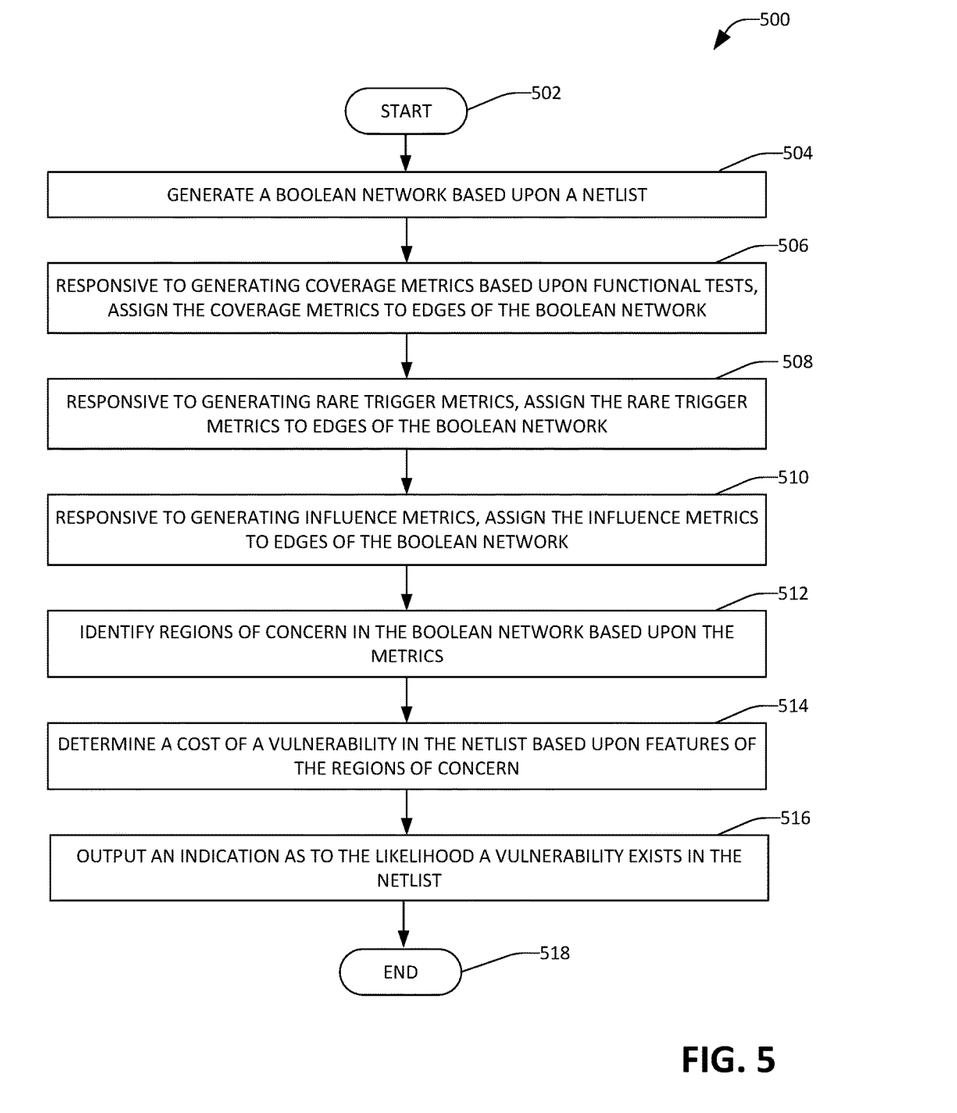
FIG. 5 is flow diagram that illustrates an exemplary methodology for determining a likelihood of a vulnerability in a netlist.

FIGS. 4-5 illustrates exemplary methodologies relating to metrics-based assessment of synthesized netlists for ASICs and FPGAs. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 4, an exemplary methodology 400 for outputting an indication as to which nodes in a Boolean network representation of a netlist are highly critical is illustrated. The methodology 400 begins at 402, and at 404 a Boolean network is generated based upon a netlist. The Boolean network is a representation of the netlist that a computing system can assign metrics to and execute functions (e.g., metric assignment, search, etc.) over.

At 406, coverage metrics based upon functional tests are assigned to edges of the Boolean network. The coverage metrics indicate whether a region of the Boolean network has been covered by the functional tests. The computing system can generate the coverage metrics by remapping the functional tests to states of the netlist. Responsive to remapping the functional tests, the computing system generates the coverage metrics based upon whether edges of the Boolean network correspond to remapped states of the netlist.

At 408, rare trigger metrics are assigned to edges of the Boolean network. The rare trigger metrics indicate whether a region of the Boolean network is a rare trigger. Rare trigger metrics can be generated by determining whether wires in the netlist have capability to serve as rare triggers because they rarely are influential as to values of output wires.

At 410, influence metrics are assigned to edges of the Boolean network. The influence metrics indicate whether flipping a state of a node in the Boolean network will cause short-term chaos in the Boolean network. The computing system can generate the influence metrics by executing a Fourier decomposition of Boolean transfer functions of the Boolean network.

At 412, criticality values are generated and assigned to nodes of the Boolean network. The criticality value of a node in the Boolean network is indicative of the possibility of the node, relative to other nodes in the Boolean network, comprising a tamper target. The computing system can generate the criticality of a node based upon the coverage metric, rare trigger metric, or influence metric of the node. Further, the computing system can rank nodes in order of the criticality values.

At 414, an indication as to which nodes in the Boolean are highly critical can be output. The computing system can identify nodes as highly critical based upon the ranked nodes in order of criticality values (e.g., via selection criteria). The indication can comprise a list or message on a display. The methodology 400 ends at 416.

Referring now to FIG. 5, an exemplary methodology 500 for determining a likelihood of a vulnerability in a netlist is illustrated. The methodology 500 begins at 502, and at 504 a Boolean network is generated based upon a netlist. The Boolean network is a representation of the netlist that a computing system can assign metrics to and execute functions (e.g., metric assignment, search, etc.) over.

At 506, coverage metrics based upon functional tests are assigned to edges of the Boolean network. The coverage metrics indicate whether or not a region of the Boolean network has been covered by the functional tests. The computing system can generate the coverage metrics by remapping the functional tests to states of the netlist. Responsive to remapping the functional tests, the computing system generates the coverage metrics based upon whether edges of the Boolean network correspond to remapped states of the netlist.

At 508, rare trigger metrics are assigned to edges of the Boolean network. The rare trigger metrics indicate whether or not a region of the Boolean network is a rare trigger. The computing system can generate the rare trigger metrics by determining whether wires in the netlist have capability to serve as rare triggers because they rarely are influential as to values of output wires.

At 510, influence metrics are assigned to edges of the Boolean network. The influence metrics indicate whether or not flipping a state of a node in the Boolean network will cause short-term chaos in the Boolean network. The computing system can generate the influence metrics by executing a Fourier decomposition of Boolean transfer functions of the Boolean network.

At 512, regions of concern in the Boolean network are identified based upon the metrics. The computing system can stack (e.g., group) nodes in the Boolean network that are connected to edges comprising certain metrics (e.g., coverage metrics that indicate the edges have not been covered by the functional tests, etc.). Stacked nodes are identified as regions of concern.

At 514, a likelihood of a vulnerability (e.g., trojan insertion) in the netlist is determined based upon features of the regions of concern. The computing system determines the likelihood of a vulnerability in the netlist based upon features of the regions of concern. The features of identified regions of concern can comprise: a minimum or maximum number of identified regions, a minimum or maximum number of nodes in the identified regions, the identified regions having a minimum or maximum metric score (e.g., individual rare trigger metric, combined metrics, etc.), etc.

At 516, an indication as to the likelihood of vulnerability in the netlist is output. The indication can comprise a message on a display. The methodology 500 ends at 518.

Figure 6:
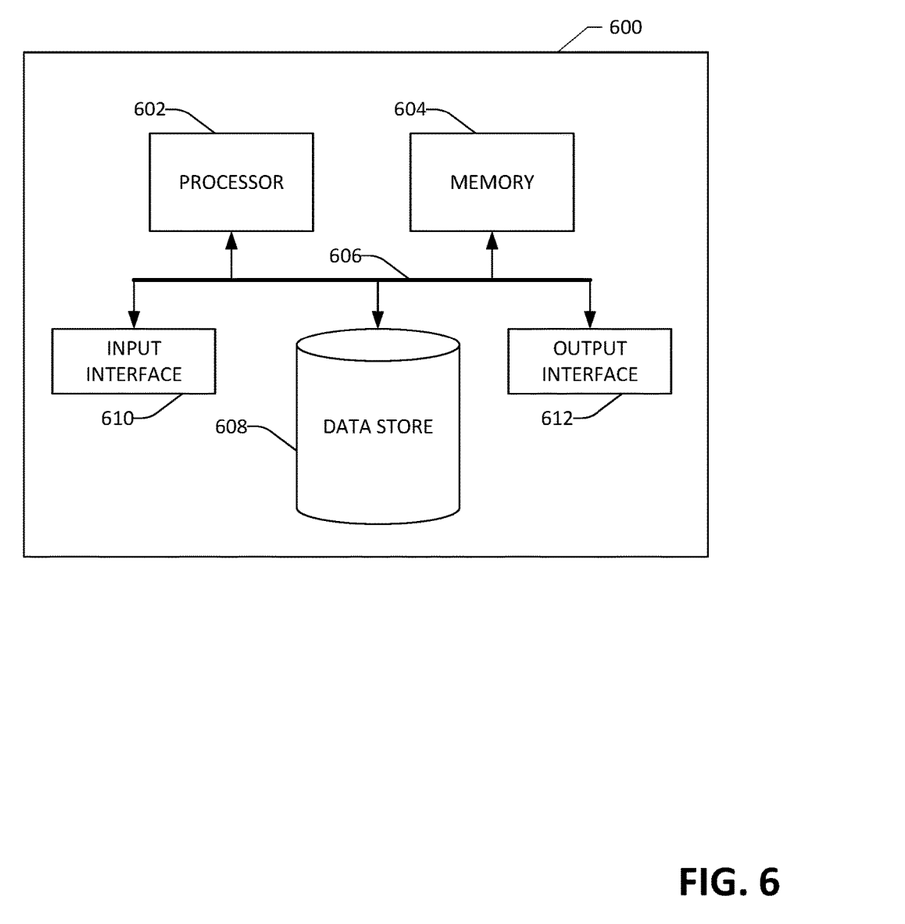
FIG. 6 is an exemplary computing system.

Referring now to FIG. 6, a high-level illustration of an exemplary computing device 600 that can be used in accordance with the systems and methodologies disclosed herein is illustrated. For instance, the computing device 600 may be used in a system that facilitates trust verification of netlists of hardware logic devices (e.g., FPGAs, ASICs, etc.). The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606.

The computing device 600 additionally includes a data store 608 that is accessible by the processor 602 by way of the system bus 606. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

It is contemplated that the external devices that communicate with the computing device 600 via the input interface 610 and the output interface 612 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 600 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 600 may be a distributed system. Thus, for instance, several devices may be in communication by way of a network connection and may collectively perform tasks described as being performed by the computing device 600.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (AS SPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A vulnerability detection system, comprising:
   at least one processor; and
   memory comprising instructions that, when executed by the at least one processor, cause the at least one processor to perform acts comprising:
      responsive to receiving a netlist that is usable to configure a hardware logic device from a design tool, the netlist synthesized by the design tool based upon source code defining intended functionality of the hardware logic device, generating a Boolean network based upon the netlist, the Boolean network comprising a directed graph;
      assigning an assessment metric to an edge of the Boolean network, wherein the assigning of the assessment metric to the edge of the Boolean network comprises:
         determining influence of a node in the Boolean network based upon a Fourier decomposition of a Boolean transfer function associated with the node, wherein the assessment metric is assigned based upon the determination;
      labeling the node in the Boolean network as being indicative of a potential vulnerability in the netlist based upon the assessment metric, wherein the label indicates that the node corresponds to logic in the netlist that is susceptible to a vulnerability; and
      outputting an indication to a user that the node has been labeled as being indicative of the potential vulnerability in the netlist.

2. The vulnerability detection system of claim 1, wherein the hardware logic device is a field-programmable gate array (FPGA).

3. The vulnerability detection system of claim 1, wherein the hardware logic device is an application-specific integrated circuit (ASIC).

4. The vulnerability detection system of claim 1, wherein the indication is a notification on a display.

5. The vulnerability detection system of claim 1, the acts further comprising:
   assigning a criticality value to the node based upon the assessment metric, wherein the criticality value is indicative of a possibility of the node comprising a vulnerability relative to other nodes in the Boolean network, and wherein the labeling of the node as being a critical node is based upon the criticality value.

6. The vulnerability detection system of claim 1, wherein the assigning of the assessment metric to the edge of the Boolean network comprises:
   receiving functional tests; and remapping the functional tests to the netlist, wherein the assessment metric is assigned to the edge based upon the remapping.

7. The vulnerability detection system of claim 1, wherein the assigning of the assessment metric to the edge of the Boolean network comprises:
determining whether the Boolean network comprises a rare trigger, wherein the assessment metric is assigned to the edge based upon the determination of whether the Boolean network comprises the rare trigger.

8. A vulnerability detection system, comprising:
at least one processor; and
memory comprising instructions that, when executed by the at least one processor, cause the at least one processor to perform acts comprising:
responsive to receiving a netlist that is usable to configure a hardware logic device from a design tool, the netlist synthesized by the design tool based upon source code that defines an intended functionality of the hardware logic device, generating a Boolean network based upon the netlist, the Boolean network comprising a directed graph;
assigning an assessment metric to an edge of the Boolean network, wherein assigning of the assessment metric to the edge of the Boolean network comprises:
determining influence of at least one node in the Boolean network based upon a Fourier decomposition of a Boolean transfer function associated with the at least one node, wherein the assessment metric is assigned based upon the determination;
labelling, based upon the assessment metric, at least one node in the Boolean network as being a region of concern, wherein the at least one node corresponds to logic in the netlist that is susceptible to a vulnerability; and
outputting an indication to a user that the at least one node has been labeled as being a region of concern.

9. The vulnerability detection system of claim 8, wherein the hardware logic device is a field-programmable gate array (FPGA).

10. The vulnerability detection system of claim 8, wherein the hardware logic device is a program-specific integrated circuit (ASIC).

11. The vulnerability detection system of claim 8, wherein the outputting of the indication comprises outputting a heatmap that indicates that the at least one node has been labeled as a region of concern.

12. The vulnerability detection system of claim 8, wherein the labeling of the at least one node comprises grouping the at least one node with other nodes in the Boolean network based upon the assessment metric.

13. The vulnerability detection system of claim 8, wherein the assigning of the assessment metric to the edge of the Boolean network comprises:
receiving functional tests; and
remapping the functional tests to the netlist, wherein the assessment metric is assigned to the edge based upon the remapping.

14. The vulnerability detection system of claim 8, wherein the assigning of the assessment metric to the edge of the Boolean network comprises:
determining whether the Boolean network comprises a rare trigger, wherein the assessment metric is assigned to the edge based upon the determination of whether the Boolean network comprises the rare trigger.

15. The vulnerability detection system of claim 8, the acts comprising:
determining a probability of the region of concern comprising the vulnerability based upon a feature of the region of concern, wherein the at least one node is labelled as being a region of concern based upon the determined probability.

16. The vulnerability detection system of claim 15, wherein the feature is a number of nodes in the region of concern.

17. A computer-readable storage medium comprising instructions that, when executed by at least one processor, cause the at least one processor to perform acts comprising:
responsive to receiving a netlist of a hardware logic device from a design tool, the netlist synthesized by the design tool based upon source code defining intended functionality of the hardware logic device, generating a Boolean network based upon the netlist;
determining influence of at least one node in the Boolean network based upon a Fourier decomposition of a Boolean transfer function associated with the at least one node;
assigning an assessment metric to an edge of the Boolean network based upon the influence of the at least one node in the Boolean network;
identifying a region of concern in the Boolean network based upon the assessment metric assigned to the edge of the Boolean network, wherein the region of concern corresponds to logic in the netlist that is susceptible to a vulnerability; and
responsive to the identifying of the region of concern, outputting an indication to a user that the Boolean network includes the region of concern.

18. The computer-readable storage medium of claim 17, the hardware logic device being one of a field programmable gate array (FPGA) or an application-specific integrated circuit (ASIC).

* * * * *